United States Patent
Margallo Balbás et al.

(10) Patent No.: US 9,690,093 B2
(45) Date of Patent: Jun. 27, 2017

(54) OPTICAL BEAM SCANNER

(71) Applicant: MEDLUMICS S.L., Tres Cantos-Madrid (ES)

(72) Inventors: Eduardo Margallo Balbás, Madrid (ES); José Luis Rubio Guivernau, Madrid (ES); Kirill Zinoviev, Madrid (ES)

(73) Assignee: Medlumics S.L., Madrid (ES)

( * ) Notice: Subject to any disclaimer, the term of this patent is extended or adjusted under 35 U.S.C. 154(b) by 0 days.

(21) Appl. No.: 14/882,291

(22) Filed: Oct. 13, 2015

(65) Prior Publication Data

US 2016/0109699 A1    Apr. 21, 2016

Related U.S. Application Data

(60) Provisional application No. 62/064,355, filed on Oct. 15, 2014.

(51) Int. Cl.
*G02B 26/08* (2006.01)
*G02B 26/10* (2006.01)
(Continued)

(52) U.S. Cl.
CPC .............. *G02B 26/103* (2013.01); *G02B 1/11* (2013.01); *G02B 6/12004* (2013.01);
(Continued)

(58) Field of Classification Search
CPC ............................ G02B 26/103; G02B 26/105; G02B 26/0833; G02B 1/11; G02B 6/136;
(Continued)

(56) References Cited

U.S. PATENT DOCUMENTS 5,263,111 A    11/1993  Nurse et al.
6,137,926 A    10/2000  Maynard
(Continued)

FOREIGN PATENT DOCUMENTS

DE    10 2009 002196 A1    10/2010
WO    WO 2008/013368 A1    1/2008

OTHER PUBLICATIONS

International Preliminary Report on Patentability issued to related International Patent Application No. PCT/EP2015/073926, dated Sep. 15, 2016; 7 pages.
English-language abstract of German Patent Publication No. DE 10 2009 002196 A1.
Liau et al., *Microlens Integration with Diode Lasers and Coherent Phase Locking of Laser Arrays*, vol. 3 No. 3, The Lincoln Laboratory Journal 1990; pp. 385-394.
(Continued)

*Primary Examiner* — James Phan
(74) *Attorney, Agent, or Firm* — Sterne, Kessler, Goldstein & Fox P.L.L.C.

(57) ABSTRACT

A scanning device is presented having a substrate with a first surface and an opposite, parallel second surface. A region of the substrate includes the first surface and the opposite parallel second surface, and is defined via an etching process through a thickness of the substrate, where the region remains attached to the substrate via one or more hinges. A waveguide is patterned over the first surface of the region and guides a beam of radiation along a length of the waveguide. The scanning device includes a facet located on the first surface of the region. The facet is designed to reflect at least a portion of the beam of radiation through the region. An optical element is located on the second surface of the region, and is designed to receive the reflected portion of the beam of radiation.

27 Claims, 12 Drawing Sheets

(51) Int. Cl.
  *G02B 6/42* (2006.01)
  *G02B 1/11* (2015.01)
  *G02B 6/12* (2006.01)
  *G02B 6/136* (2006.01)

(52) U.S. Cl.
  CPC ........... *G02B 6/136* (2013.01); *G02B 6/4214* (2013.01); *G02B 26/0833* (2013.01); *G02B 26/105* (2013.01); *G02B 2006/12061* (2013.01); *G02B 2006/12102* (2013.01); *G02B 2006/12104* (2013.01)

(58) Field of Classification Search
  CPC .............. G02B 6/12004; G02B 6/4214; G02B 2006/12102; G02B 2006/12104; G02B 2006/12061
  USPC ................... 359/201.1, 205.1, 209.1–210.1, 359/212.1–214.1, 225.1–226.2; 385/18, 385/25, 33, 53, 73, 88, 93, 119
  See application file for complete search history.

(56) References Cited

U.S. PATENT DOCUMENTS

| | | | |
|---|---|---|---|
| 7,236,666 B2 | 6/2007 | Towle et al. | |
| 2006/0239605 A1 | 10/2006 | Palen et al. | |
| 2010/0135619 A1 | 6/2010 | Choi et al. | |
| 2011/0091181 A1* | 4/2011 | DeMeritt | G02B 6/02033 385/140 |

OTHER PUBLICATIONS

Brusberg et al., *Single-mode Glass Waveguide Platform for DWDM Chip-to-Chip Interconnects*, Proc. SPIE vol. 8267, Optoelectronic Interconnects XII, 2012; pp. 1532-1539.

Hendrickx et al., *Coupling Structures for Out-of-plane Coupling in Optical PCBs*, Proc. of SPIE vol. 6992, 2008; pp. 69920R-1-69920R-9.

International Search Report and Written Opinion issued to related International Patent Application No. PCT/EP2015/073926, dated Dec. 14, 2015; 11 pages.

* cited by examiner

OPTICAL BEAM SCANNER

This application claims the benefit of U.S. provisional application No. 62/064,355, filed Oct. 15, 2014, which is incorporated by reference herein in its entirety.

BACKGROUND

Field

Embodiments of the invention relate to designs of a microfabricated beam scanning device and its use in an arrayed format.

Background

Beam steering in imaging devices can be realized using various techniques making use of electro or thermo optical effects on chip or using mechanical scanning by moving lenses or mirrors in free space. A typical mechanism for beam steering uses a mirror for steering the light coming out of an optical waveguide and includes a collimating lens and a mirror located at some distance from the waveguide. The two-dimensional scanning mirror deflects the light beam and projects it over a sample.

The light propagation along optical waveguides patterned on chip occurs in-plane. However planar technologies commonly used for fabrication of integrated devices do not allow for fabrication of efficient collimating (or focusing) elements to obtain high quality performance. The lens is commonly located symmetrically with respect to the optical axis of the waveguide. A hybrid solution is often used to overcome this issue: a free space lens is attached to the same optical bench where the waveguide is fixed. However, aligning the free space lens requires very high precision in all three orthogonal directions on the order of 1 micron.

Many interferometry devices, such as optical coherence tomography (OCT) systems, use collimated light that is further directed to a focusing lens operated in telecentric mode to make the total optical path length indifferent to beam location on the imaged sample. Using free space optical elements can provide high quality performance; however it is relatively bulky, requires precise alignment, and does not leave much possibility for reduction of the overall size of the device.

BRIEF SUMMARY

In the embodiments presented herein, device designs of a microfabricated optical beam scanner that can be used with OCT applications are presented. The design also allows for batch fabrication of the device in order to form scanning arrays.

In an embodiment, a device is presented that includes a substrate having a first surface and an opposite, parallel second surface. The device includes a waveguide patterned over the first surface and configured to guide a beam of radiation along a length of the waveguide. The device also includes a facet located on the first surface and designed to reflect at least a portion of the beam of radiation at an angle that is substantially perpendicular to the first surface. An optical element is located on either the first surface or the second surface, and is designed to receive the reflected portion of the beam of radiation.

In another embodiment, a scanning device is presented having a substrate with a first surface and an opposite, parallel second surface. A region of the substrate includes the first surface and the opposite parallel second surface, and is defined via an etching process through a thickness of the substrate, where the region remains attached to the substrate via one or more hinges. A waveguide is patterned over the first surface of the region and guides a beam of radiation along a length of the waveguide. The scanning device includes a facet located on the first surface of the region. The facet is designed to reflect at least a portion of the beam of radiation through the region. An optical element is located on the second surface of the region, and is designed to receive the reflected portion of the beam of radiation.

In another embodiment, a scanning device is presented that includes a plurality of individually addressable elements formed from the same substrate. Each element of the plurality of elements includes a region of the substrate, a waveguide, a facet, and an optical element. The region has a first surface and an opposite parallel second surface, where the region is defined via an etching process through a thickness of the substrate, and where the region remains attached to the substrate via one or more hinges. The waveguide is patterned over the first surface of the region and guides a beam of radiation along a length of the waveguide. The facet is located on the first surface of the region and is designed to reflect at least a portion of the beam of radiation through the region. The optical element is located on the second surface of the region, and is designed to receive the reflected portion of the beam of radiation. Each element of the plurality of elements is designed to steer a corresponding beam of radiation via movement of a corresponding region.

BRIEF DESCRIPTION OF THE DRAWINGS/FIGURES

The accompanying drawings, which are incorporated herein and form a part of the specification, illustrate embodiments of the present invention and, together with the description, further serve to explain the principles of the invention and to enable a person skilled in the pertinent art to make and use the invention.

Embodiments of the present invention will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

Embodiments herein relate to various designs of an optical beam scanner. Such scanning devices are useful for imaging applications that may acquire data by sweeping a beam of radiation across a sample. These imaging applications include, but are not limited to, interferometry, Fourier transform infrared microscopy (FITR), confocal microscopy, and RAMAN spectroscopy. Optical coherence tomography (OCT) is one technique that is described herein and can benefit from the use of the embodied devices.

Herein, the terms "electromagnetic radiation," "light," "beam of radiation," and "optical beam" are all used to describe the same electromagnetic signals propagating through the various described elements and systems.

The various device designs allow for the optical beam scanner to be fabricated using standard microfabrication techniques. In this way, bulk fabrication produces a high number of scanning devices with good uniformity and low cost. It should be understood that the embodiments of the present invention are not limited to specific fabrication steps taken to make the devices. There are many potential fabrication techniques known to one of ordinary skill in the art that could be used to ultimately fabricate the devices embodied herein.

Figure 1:
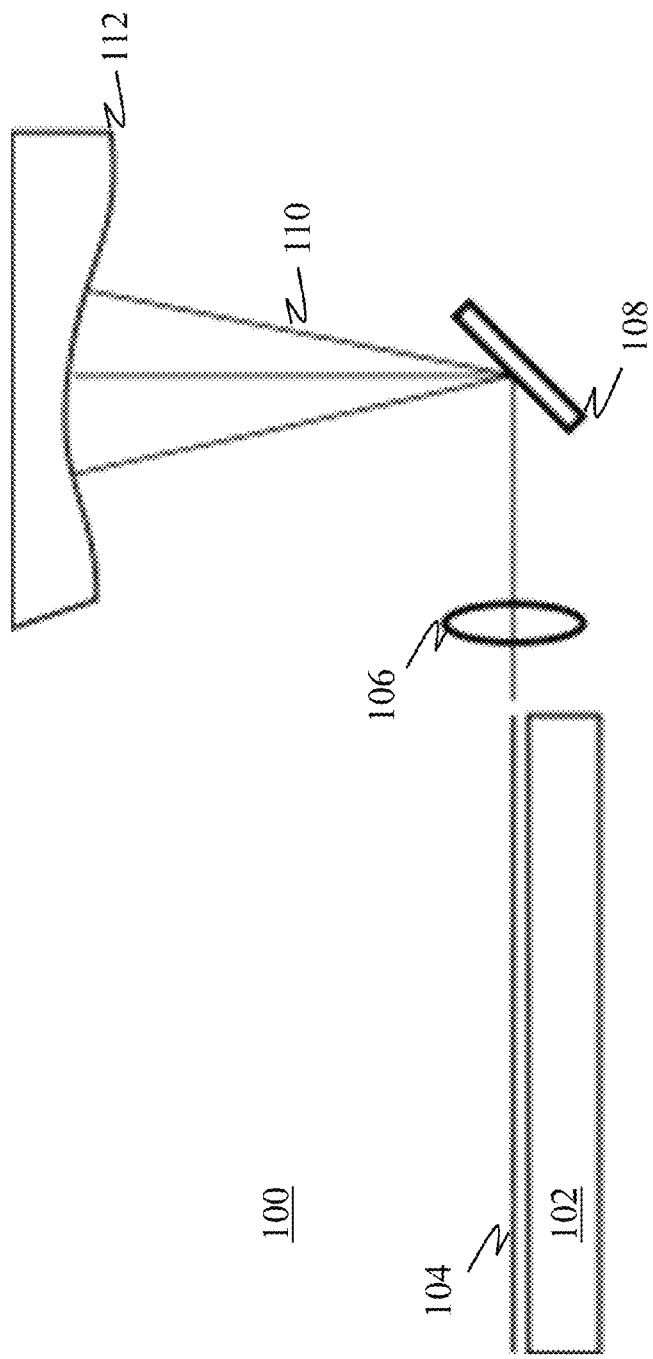
FIG. 1 illustrates a beam scanning device using free-space optics.

One advantage to microfabrication is the monolithic integration of components which leads to better alignment and lower optical losses. FIG. 1 illustrates an example of a beam scanning device 100 that uses free-space optical elements to direct a beam towards a sample. A substrate 102 includes a patterned waveguide 104 to guide a beam of light towards a lens 106. Lens 106 is aligned off-chip with the output facet of waveguide 104. Lens 106 focuses the light onto a separate scanning mirror 108. An output beam of radiation 110 is reflected from scanning mirror 108 towards sample 112. Scanning mirror 108 is coupled to an actuator in order to laterally move and/or tilt the angle of scanning mirror 108 in order to steer the direction of beam of radiation 110 towards sample 112. Alternatively light may be collimated by lens 106, reflected by mirror 108 and directed to a focusing lens operated in a telocentric mode and located between sample 112 and mirror 108.

Beam steering device 100 may produce a wide beam steering angle due to the range of movement afforded to scanning mirror 108. However, beam steering device 100 requires the use of free-space optical elements making miniaturization very difficult. Additionally, each of the optical elements must be precisely aligned which requires great skill and is time consuming.

FIGS. 2-5 illustrate various embodiments of a device designed to direct a beam of radiation. The embodiments utilize the same basic concept of directing a beam of radiation at an angle that is substantially perpendicular to a surface of the substrate. However, the embodiments differ in the placement and formation of certain elements.

Figure 2:
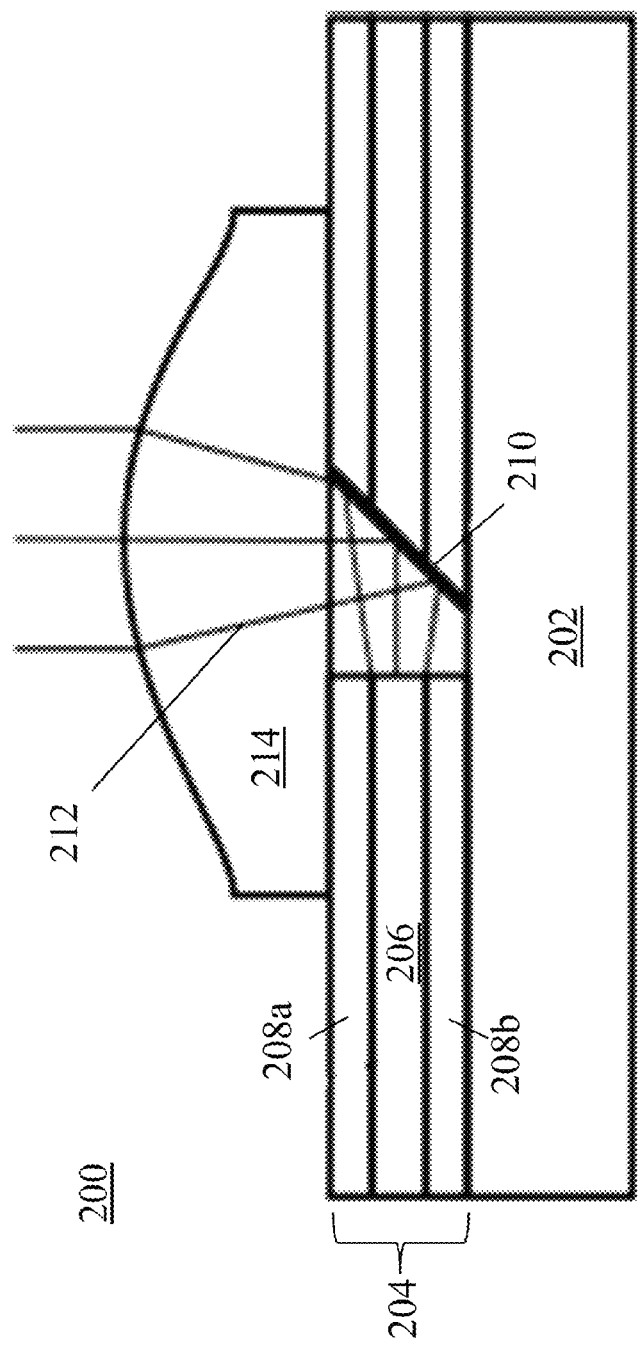
FIG. 2 illustrates a device for directing an optical beam, according to an embodiment.

FIG. 2 illustrates a device 200 designed to direct a beam of radiation, according to an embodiment. Device 200 includes a substrate 202, a waveguide 204 that includes a core layer 206 surrounded by cladding layers 208a and 208b, and an optical element 214. A reflector 210 is formed in-plane with waveguide 204 and is designed to reflect a beam of radiation 212 towards optical element 214.

Substrate 202 may be any suitable material that allows for surface and/or bulk micromachining patterning steps to be performed. In one example, substrate 202 is a crystalline material such as silicon, gallium arsenide, indium phosphide, etc. In other examples, substrate 202 is amorphous such as glass or polysilicon. Core layer 206 of waveguide 204 may comprise a material having a higher refractive index than cladding layers 208a and 208b in order to confine a beam of radiation propagating through waveguide 204. Waveguide 204 may have a crystalline structure or be a polymer. Examples of waveguide 204 materials include, but are not limited to, silicon, silicon nitride, indium gallium arsenide, doped silicon, PMMA, Parylene, and SU-8. In one example, cladding layers 208a and 208b are silicon dioxide while both substrate 202 and core layer 206 are silicon. Waveguide 204 may be a strip waveguide, ridge waveguide, or an optical fiber laid across the surface of substrate 202.

Reflector 210 is placed a short distance from an end of waveguide 204, according to an embodiment. This distance cannot be too large, or else the beam of radiation exiting from waveguide 204 will spread too far and undesirable optical losses will occur. In this embodiment, both reflector 210 and waveguide 204 are patterned in-plane on a first surface of substrate 202. Reflector 210 may be designed to have a surface that is angled. For example, reflector 210 may have a surface that is angled at a substantially 45 degree angle with respect to the first surface of substrate 202. This angle causes the beam of radiation to be directed at an angle that is substantially perpendicular to the surface of substrate 202. In another example, reflector 210 has a surface that is angled at a substantially 54.74 degree angle with respect to the first surface of substrate 202. In the embodiment illustrated in FIG. 2, the light is reflected up and away from substrate 202 towards optical element 214.

Reflector 210 may be formed from etching the layers that form waveguide 204, according to an embodiment. A wet anisotropic etchant may be used to strip away the material along the crystal planes to form the surface of reflector 210. The surface may be further smoothed via an oxide removal process by quickly exposing reflector 210 to another chemical etchant such as hydrofluoric acid (HF). Dry etching techniques may be employed as well for creating the angled surface of reflector 210. For example, reactive ion etching (RIE) using a grey-scale type mask to produce photoresist at varying heights can be used to produce non-planar structures.

Optical element 214 is disposed over waveguide 204 and over a top surface of substrate 202, according to an embodiment. In this embodiment, optical element 214 is a lens. The lens may be designed to focus beam of radiation 212 or to collimate beam of radiation 212. Optical element 214 may be manufactured using nano-imprint lithography or standard lithography etching using a grey-scale mask. Thermal reflow of a transparent polymer may also be used to form the curved lens shape. Optical element 214 may be fabricated using RIE directly in substrate 202. The advantage of using RIE may be realized when the substrate material has a high refractive index (e.g., material such as silicon, InP, etc.), thus the performance of the lens depends much less on the refractive index of the surrounding media. The curvature and position of the focusing surface of the lens may be adjusted so that the focal point and focal distance of the lens achieve the desired collimating or focusing performance. In one example, an intermediate polymer layer is introduced between optical element 214 and waveguide 204 in order to set a lens working distance. Optical element 214 may be subsequently coated with an anti-reflective dielectric stack to minimize light loss.

Figure 3:
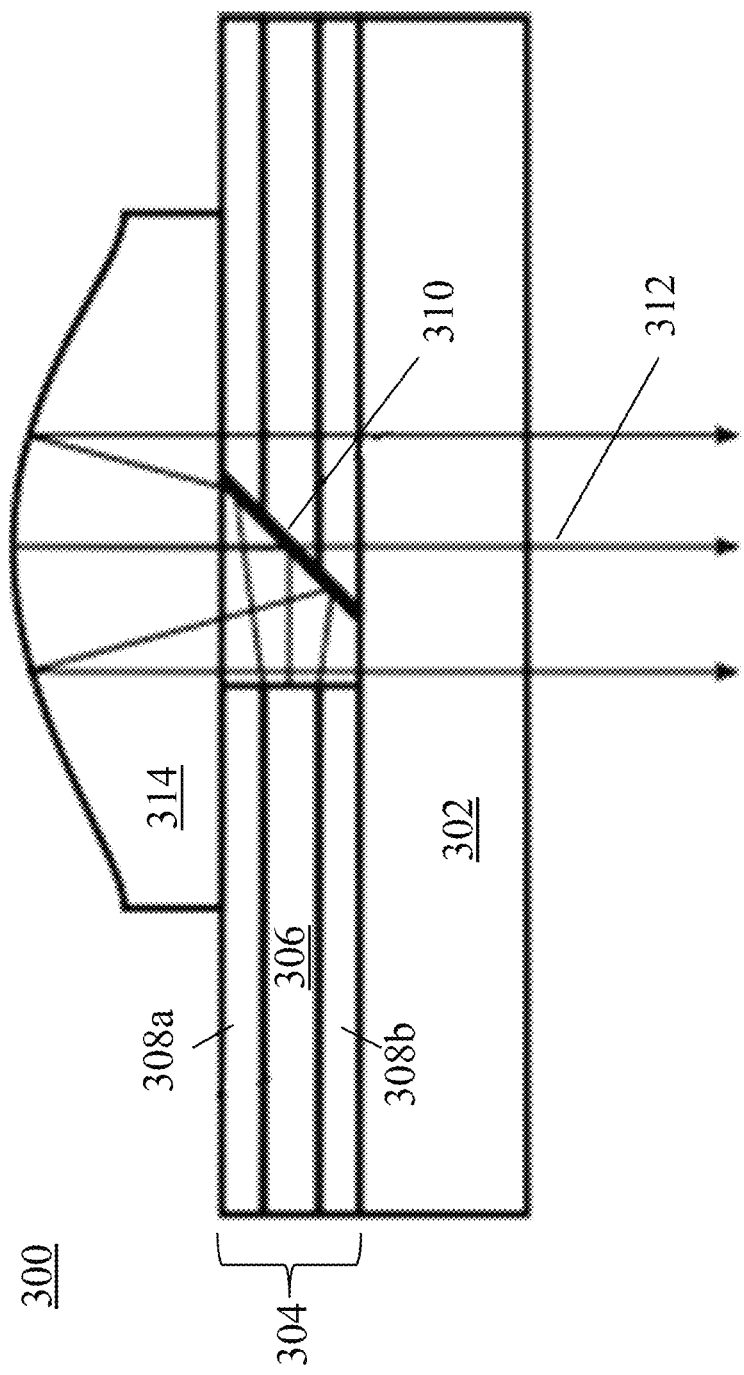
FIG. 3 illustrates a device for directing an optical beam, according to an embodiment.

FIG. 3 illustrates another embodiment of a device 300 designed to direct a beam of radiation. Device 300 includes many of the same elements as device 200, including a substrate 302, a waveguide 304 with core layer 306 and cladding layers 306a and 306b, and a reflector 310 positioned some distance away from an end of waveguide 304. Description of these elements will not be repeated for this embodiment.

Device 300 includes an optical element 314. In this embodiment, optical element 314 is a mirror. As such, optical element 314 receives beam of radiation 312 reflected from reflector 310 and reflects the beam of radiation down towards substrate 302. Optical element 314 may be curved in such a way that beam of radiation 312 is collimated as it reflects away from optical element 314. Optical element 314 may be formed using any of the same techniques described above for optical element 214. In order to penetrate substrate 302, substrate 302 includes a material that is substantially transparent to a wavelength of beam of radiation 312. For example, substrate 302 may be silicon while beam of radiation 312 is in the infrared range. Examples of infrared ranges include near-infrared (800 nm-1.4 µm), short-wave infrared (1.4-3 µm), mid-wave infrared (3-8 µm), and long-wave infrared (15-1000 µm).

Figure 4:
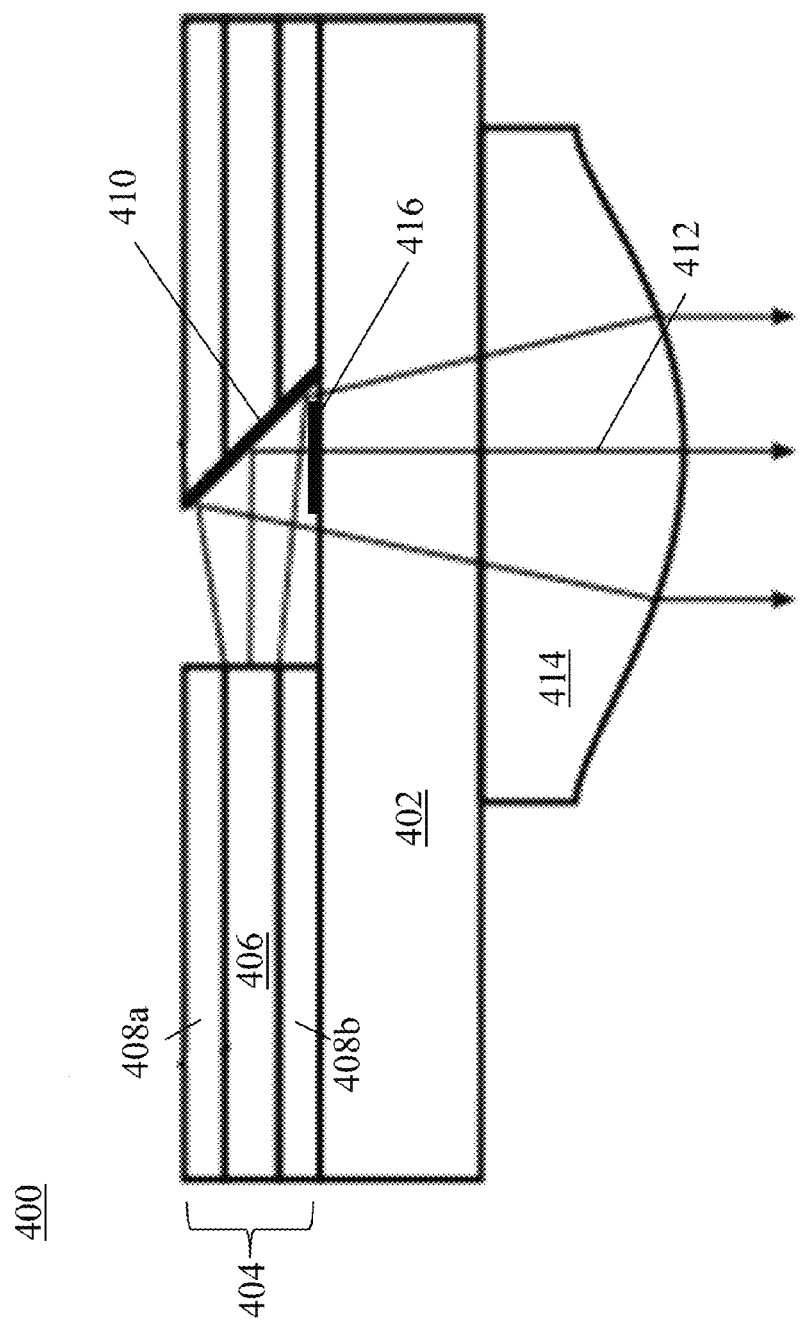
FIG. 4 illustrates a device for directing an optical beam, according to an embodiment.

FIG. 4 illustrates another embodiment of a device 400 designed to direct a beam of radiation. Device 400 includes many of the same elements as device 200, including a substrate 402, a waveguide 404 with core layer 406 and cladding layers 408a and 408b, and a reflector 410 positioned some distance away from an end of waveguide 404. However, reflector 410 is angled such that a beam of radiation 412 is reflected downwards towards substrate 402, according to this embodiment. Beam of radiation 412 traverses substrate 402 and is ultimately received by optical element 414. While waveguide 404 is patterned over a first surface of substrate 402, optical element 414 is coupled to an opposite, parallel surface of substrate 402. In this way, both sides of substrate 402 are utilized for directing and/or modulating beam of radiation 412. In this embodiment, optical element 414 is a lens similar to optical element 214.

Since beam of radiation 412 is reflected through substrate 402 before it arrives at optical element 414, unwanted reflections of the light may occur at the surface of substrate 402. Additionally, any reflected light from the surface of substrate 402 may couple back into waveguide 404, causing undesirable interference. According to an embodiment, device 400 includes an anti-reflective (AR) coating 416. AR coating 416 may be applied and patterned on the surface of substrate 402 before the patterning of waveguide 404. AR coating 416 may be patterned such that it only exists beneath reflector 410, or it may encompass a larger area on the surface of substrate 402. In one example, AR coating 416 exists across the entire surface of substrate 402.

Figure 5:
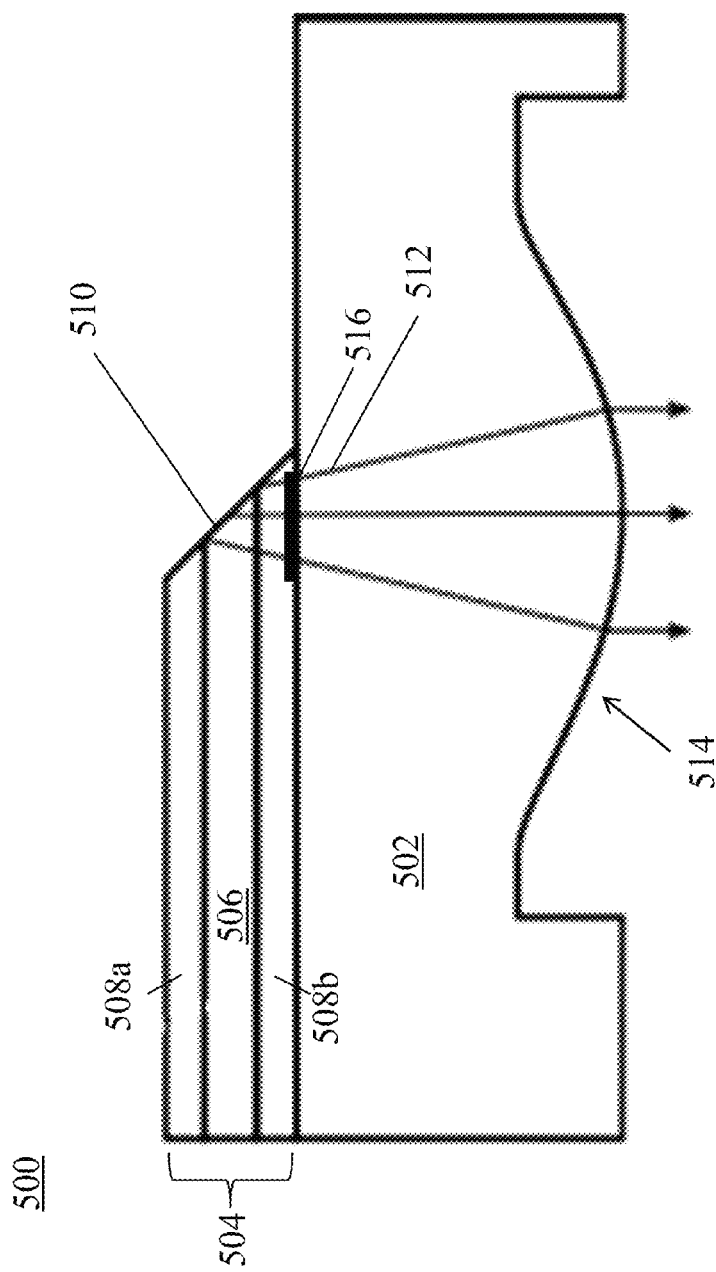
FIG. 5 illustrates a device for directing an optical beam, according to an embodiment.

FIG. 5 illustrates another embodiment of a device 500 designed to direct a beam of radiation. Device 500 includes some of the same elements as device 200, such as substrate 502, waveguide 504 with core layer 506 and cladding layers 508a and 508b. In this embodiment, reflector 510 is formed from a facet at the end of waveguide 504. In this way, a beam of radiation 512 is reflected downwards towards substrate 502 before it has exited from waveguide 504.

An antireflective (AR) coating 516 is included at an interface between waveguide 504 and substrate 502, according to an embodiment. AR coating 516 may be patterned such that it only exists beneath reflector 510. In another example, AR coating 516 covers a larger area on the surface of substrate 502. AR coating 516 may exist across the entire surface of substrate 502.

According to an embodiment, optical element 514 is formed in substrate 502 on an opposite surface from the surface where waveguide 504 is patterned. Optical element 514 may be designed to act as either a lens or a mirror. Optical element 514 may be patterned using RIE along with grey-scale lithography to create the non-uniform etch within substrate 502.

Figure 6:
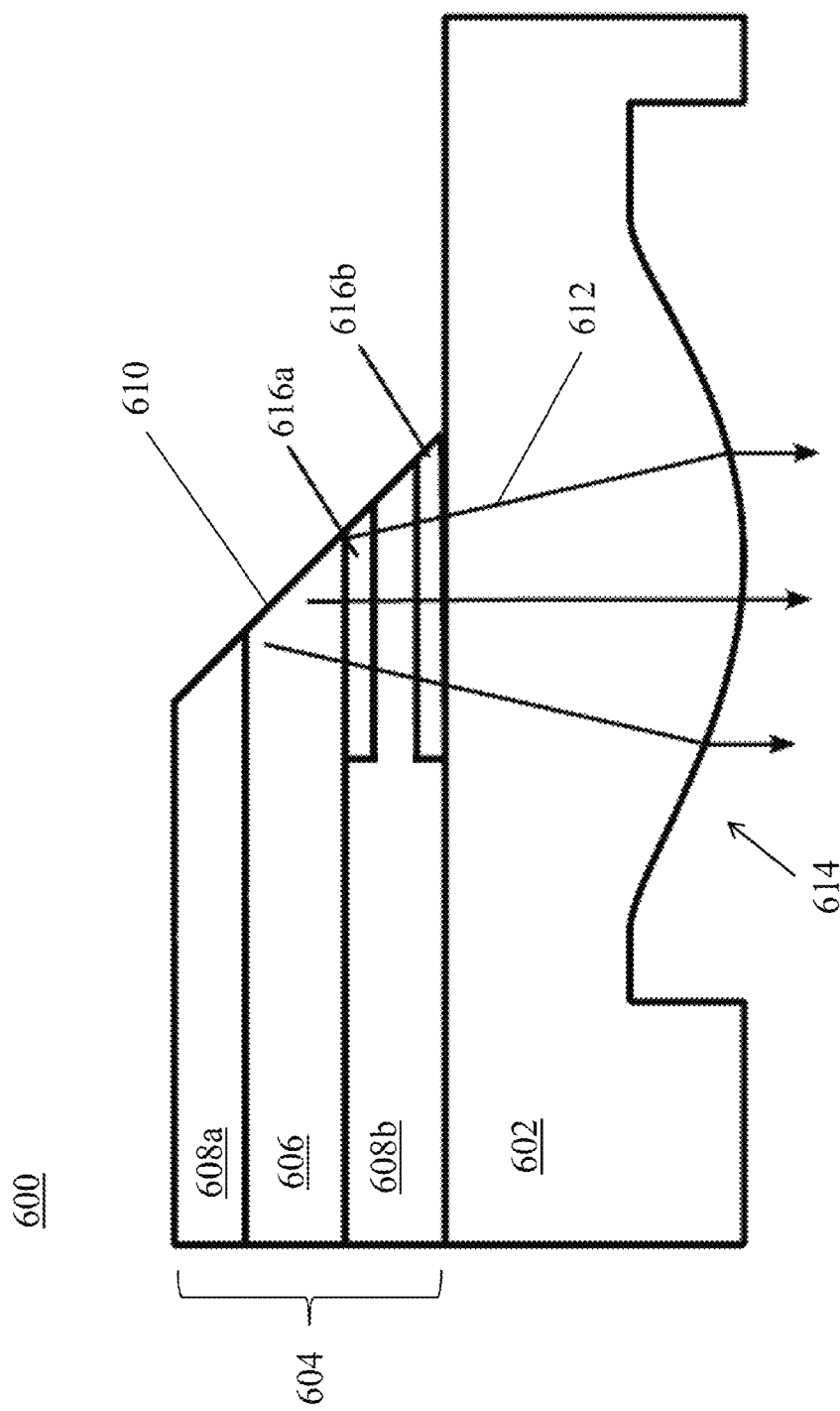
FIG. 6 illustrates a device for directing an optical beam, according to an embodiment.

FIG. 6 illustrates another embodiment of a device 600 designed to direct a beam of radiation. Device 600 is similar to device 500 and includes many of the same components such as substrate 602, waveguide 604 having core layer 606 and cladding layers 608a and 608b and reflector 610 to reflect a beam of radiation 612 towards an optical element 614. Two AR coating layers 616a and 616b are included within the path of beam of radiation 612 as it propagates towards optical element 614, according to an embodiment. AR coating 616a may be located at the interface between core layer 606 and cladding layer 608b while AR coating 616b may be located at the interface between cladding layer 608b and substrate 602.

According to another embodiment, AR coating 516 from FIG. 5 or AR coating layers 616a and 616b from FIG. 6 are excluded from the design. In this case, a thickness t of either cladding layer 508b or cladding layer 608b may be determined to substantially eliminate backscattering of beam of radiation 512/612 at the interface between cladding layer 508b/608b and substrate 502/602.

In one example, cladding layer 508b/608b may comprise silicon dioxide with a refractive index of about $n_1 = 1.4467$, while core layer 506/606 and substrate 502/602 comprise silicon with refractive indices of $n_0 = 3.4434$ and $n_2 = 3.4434$, respectively. The refractive indices are provided for a given wavelength $\lambda = 1.32$ µm. A reflectivity R at the silicon—silicon dioxide—silicon interfaces between core layer 506/606, cladding layer 508b/608b, and substrate 502/602 is provided by:

$$R = \frac{r_1^2 + r_2^2 + 2r_1 r_2 \cos(2\varphi)}{1 + r_1^2 r_2^2 + 2r_1 r_2 \cos(2\varphi)} \quad (1)$$

Where:

$$r_1 = \frac{n_0 - n_1}{n_0 + n_1} \quad (2)$$

$$r_2 = \frac{n_1 - n_2}{n_1 + n_2} \quad (3)$$

$$\varphi = \frac{2\pi n_1 t}{\lambda} \quad (4)$$

Figure 11:
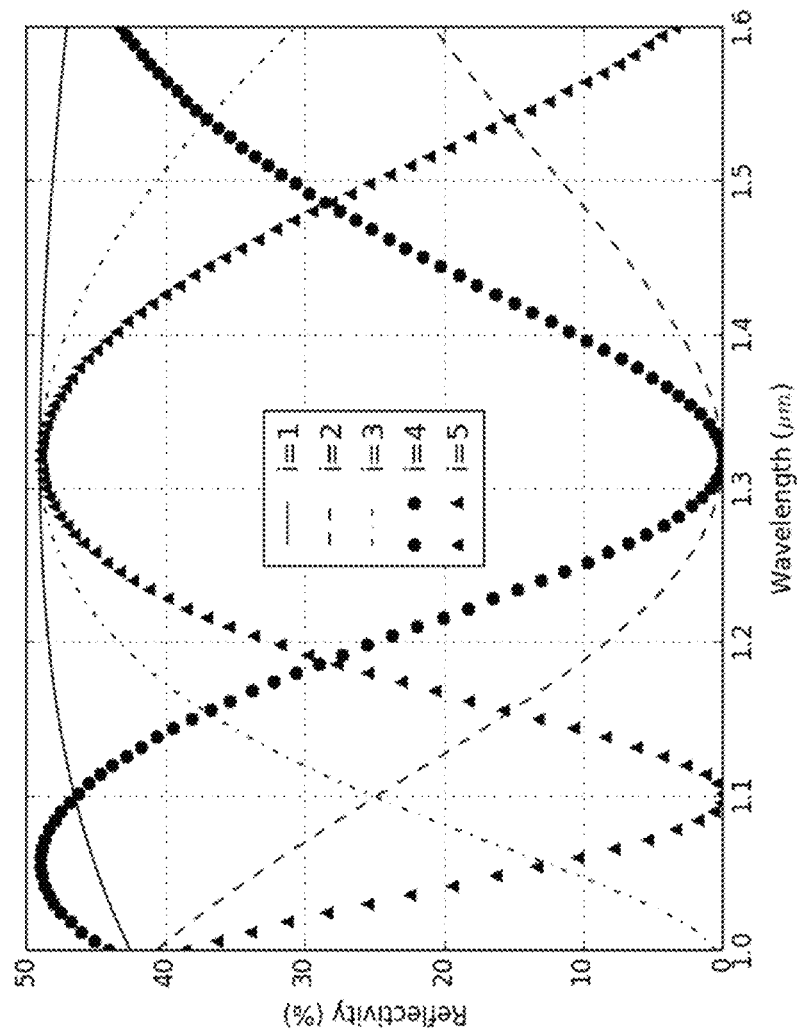
FIG. 11 illustrates a simulated plot of reflectively vs. wavelength for different i values, according to an embodiment.

The t values that maximize or minimize Eq. (1) can be obtained by solving for dR/dt=0, which results in:

$$\sin\left(\frac{4\pi n_1 t}{\lambda}\right) = 0 \xrightarrow{yields} t = i\frac{\lambda}{4n_1} \quad (5)$$

where i is a positive integer greater than zero. For this particular embodiment, R is minimized for λ=1.32 μm when i is an even positive integer as illustrated in FIG. 11. Furthermore, it can be observed from FIG. 11 that the reflectivity peak is broader when i=2 (i.e., t=λ/(2n$_1$). Using this thickness (t=λ/(2n$_1$)) for cladding layer 508b/608b may enable low backscattering of the light in applications that require a wider bandwidth.

FIGS. 2-6 illustrate embodiments for directing a beam of radiation through an optical element. These embodiments do not have the inherent ability to change the direction of the output beam without the use of some modulating element. Although some optical modulating elements (e.g., thermal, acoustic, electric, etc.) may be included to steer the direction of the output beam, the range of angles that can be achieved are small compared to physical tilting or movement of certain elements.

Figure 7A:
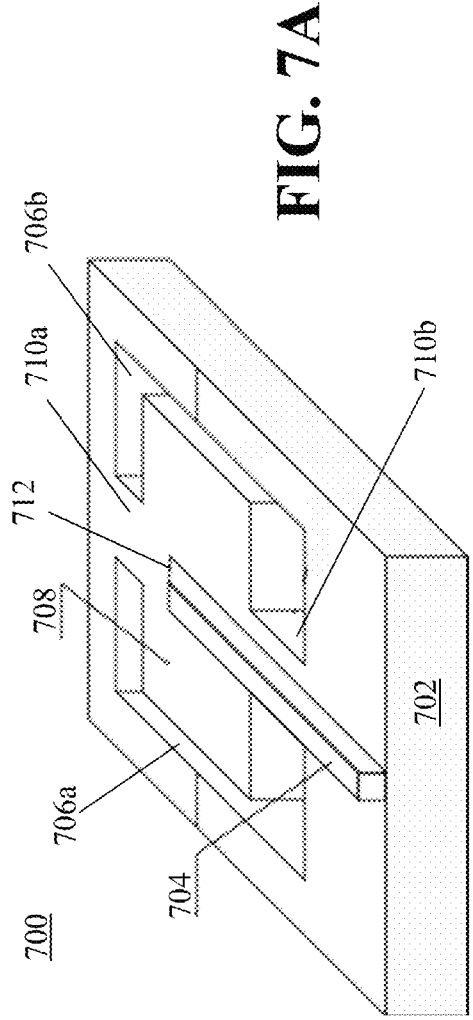
FIGS. 7A-7C illustrate various views of an optical beam scanner, according to an embodiment.
Figure 7B:
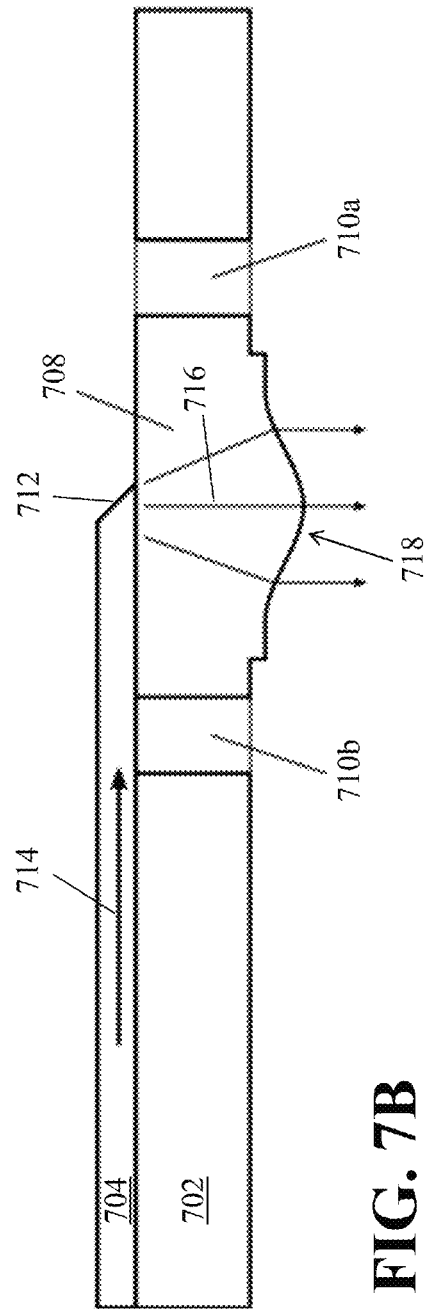
Figure 7C:
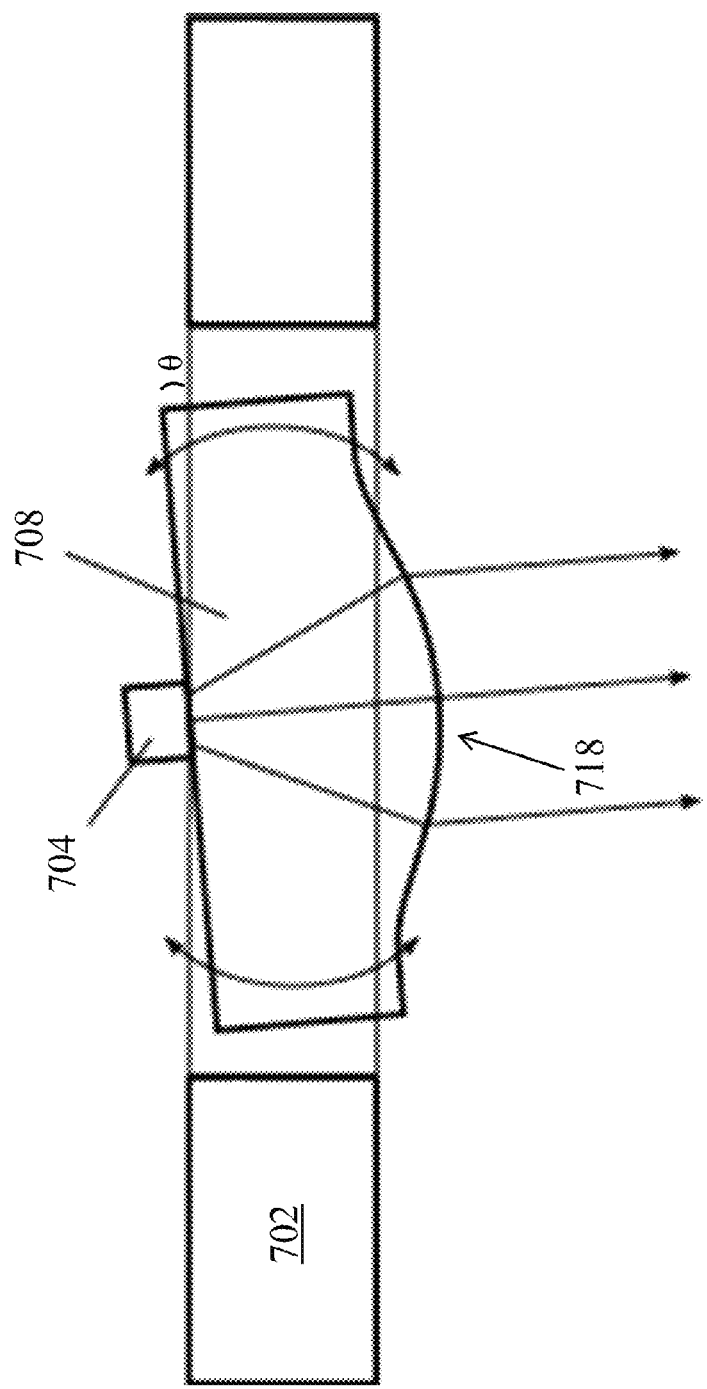

FIGS. 7A-7C illustrate various views of a scanning device 700, according to an embodiment. FIG. 7A provides an isometric view, FIG. 7B provides a side view, and FIG. 7C provides another side view of scanning device 700. Scanning device 700 includes a substrate 702, a waveguide 704, and etched areas 706a and 706b which define a region 708 attached to substrate 702 via hinges 710a and 710b, according to an embodiment. Substrate 702 and waveguide 704 are similar to those described above with reference to FIGS. 2-6. Scanning device 700 may also include an antireflective (AR) coating between waveguide 704 and region 708.

In the embodiment shown, a reflector 712 is included as a facet at the end of waveguide 704, which is patterned over region 708. Reflector 712 receives a beam of radiation 714 propagating along a length of waveguide 704 and reflects beam of radiation 716 through region 708 and towards an optical element 718 disposed on an opposite, parallel surface of region 708. Reflector 712 may also be included some distance away from waveguide 704 as previously described with respect to any of FIGS. 2-4.

Etched regions 706a and 706b penetrate through the thickness of substrate 702, such that region 708 is only suspended in place via hinges 710a and 710b, according to an embodiment. Etched regions 706a and 660b may be formed using a dry chemical etching process such as RIE, deep reactive ion etching (DRIE), inductively coupled plasma (ICP) etching, Xenon Difluoride (XeF$_2$) etching etc. or using a wet chemical etching process such as potassium hydroxide (KOH) etching, or tetramethylammonium hydroxide (TMAH) etching.

Optical element 718 may be a lens or mirror as discussed previously, and may be formed via any of the methods already described in the embodiments illustrated in FIGS. 2-6. Optical element 718 may be used to either focus or collimate beam of radiation 716. In the embodiment illustrated in FIG. 7B, optical element 718 is a lens patterned in the bottom surface of region 708. In this way, reflector 712 is located on a top surface of region 708 while optical element 718 is on an opposite, parallel bottom surface of region 708.

Region 708 may be attached to substrate 702 via any number of hinges. For example, only a single hinge may be used to attached region 708 to substrate 702. In another example, multiple hinges located along one side of region 708 may be used. In yet another example, a hinge may be placed along each side or each corner of region 708. Waveguide 704 may be pattered to extend along the surface of one of the hinges such that reflector 712 is located over region 708. In the embodiment illustrated in FIG. 7A, waveguide 704 is patterned over hinge 710b.

Region 708 is able to rotate about an axis that passes through hinges 710a and 710b, according to an embodiment. This rotation is illustrated in FIG. 7C. Based on the stiffness and size of hinges 710a and 710b, region 708 may rotate up to an angle θ with respect to the top surface of region 708. In one example, region 708 may rotate up to 10 degrees. In another example region 708 may rotate up to 20 degrees. Region 708 may be capable of rotating about any number of axes passing through any number of hinges that couple region 708 to substrate 702. In an embodiment, both the source of the beam of radiation (reflected from reflector 712) and optical element 718 are rotated together as a rigid structure thus providing uniform aberration level operation throughout the scanning range. In another embodiment, region 708 may be laterally displaced with respect to an axis that passes through hinges 710a and 710b.

The rotation of region 708 may be performed via a variety of well-known techniques in the field of Microelectromechanical systems (MEMS). For example, region 708 may be electrically isolated from a portion of substrate 708, while a first potential is applied to region 708 and a different potential is applied to the portion of substrate 708 in proximity to region 708. The electrostatic interaction caused by the difference in potential causes a movement in region 708. Capacitance pull-in effects may also be leveraged to cause a rotation of region 708. Piezoelectric materials (such as PZT or PVDF) may also be employed to cause rotation of region 708. In another embodiment, electromagnetic actuation can be used if an electric coil is fabricated on region 708. Electric current flowing through the coil excites a magnetic field which interacts with a magnetic field induced in proximity of region 708 thus producing rotation/displacement of region 708.

Figure 8:
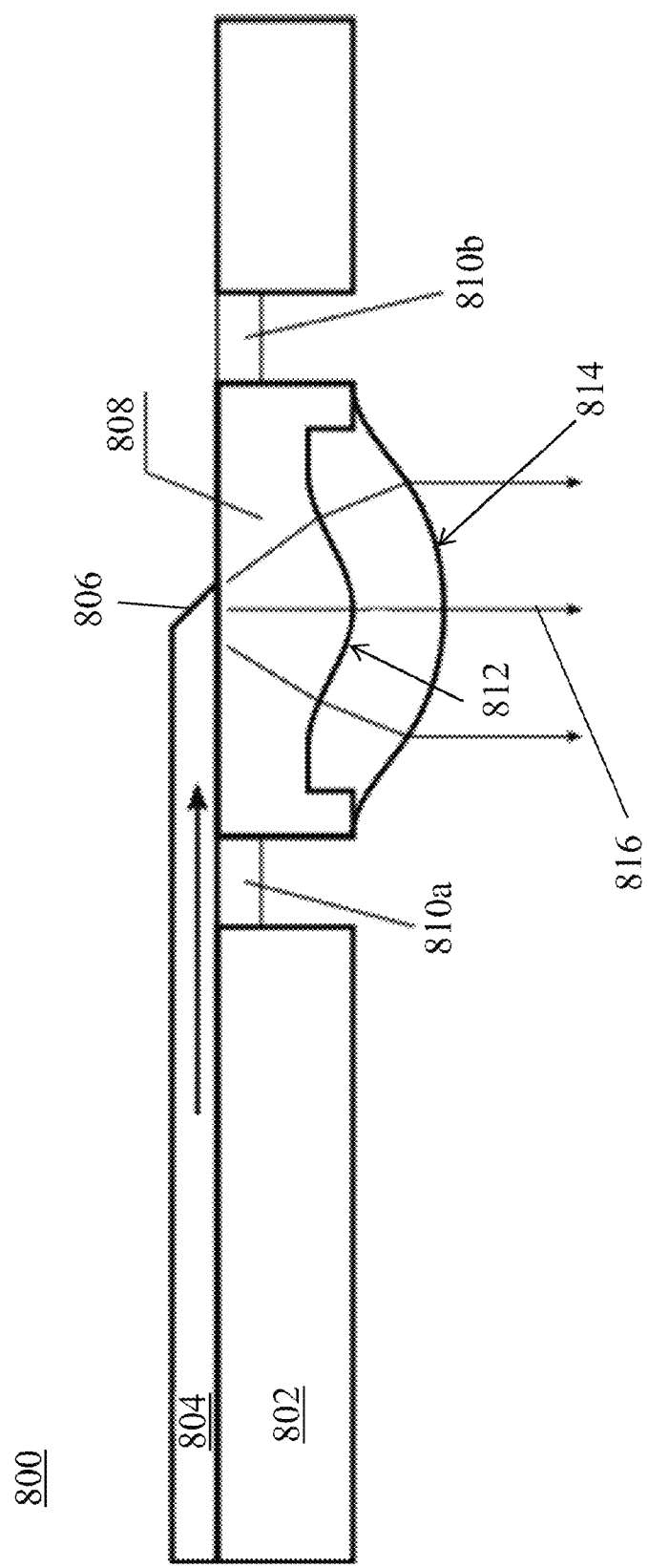
FIG. 8 illustrates an optical beam scanner with two optical elements, according to an embodiment.

FIG. 8 illustrates another embodiment of a scanning device 800. Scanning device 800 includes many similar features as scanning device 800, such as substrate 802, waveguide 804, reflector 806, and region 808 supported by hinges 810a and 810b. Scanning device 800 includes an optical element 812 formed in the lower surface of region 808 via, for example, micromachining techniques. Optical element 812 may be a lens formed from the same silicon that makes up the rest of region 808, while a second optical element 814 is coupled to an outer surface of optical element 812. Second optical element 814 may have a different refractive index than optical element 812. For example, second optical element 814 may be a polymer while optical element 812 is a silicon lens.

Figure 9:
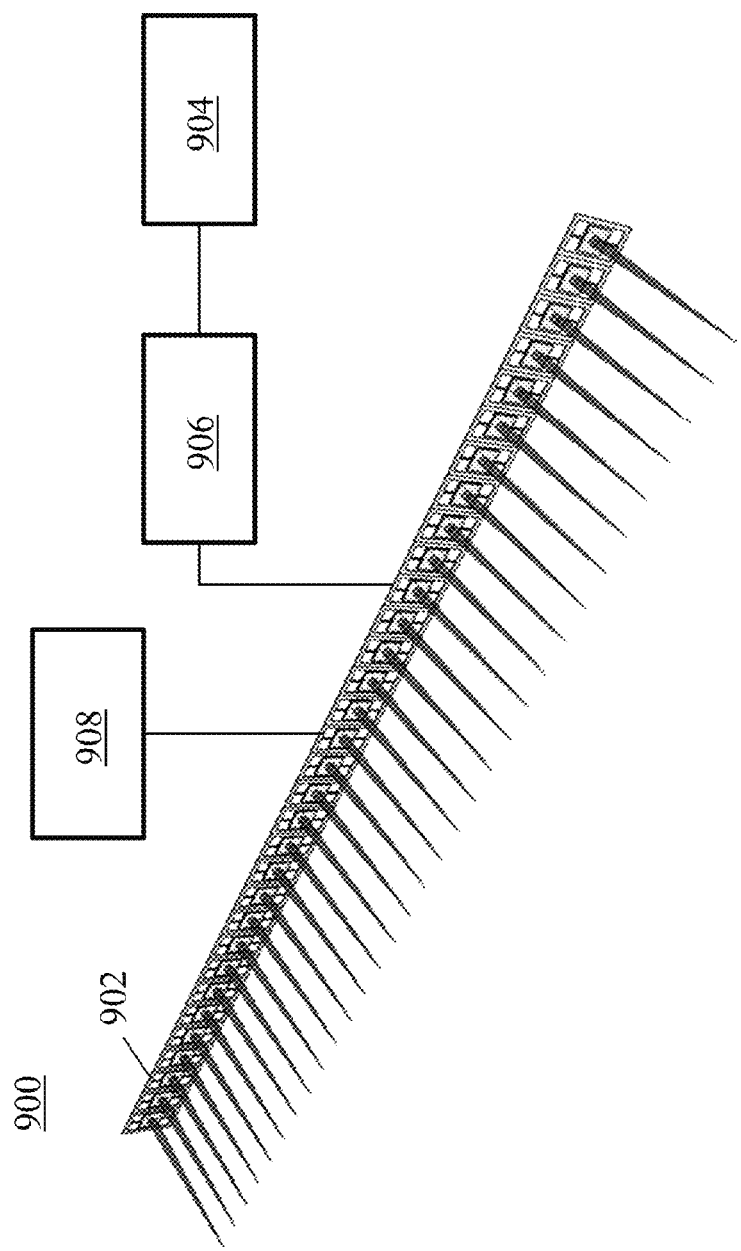
FIG. 9 illustrates a beam scanning device having a plurality of addressable elements, according to an embodiment.

FIG. 9 illustrates a scanning array 900 that includes a plurality of individually addressable elements 902, according to an embodiment. Each addressable element 902 may function substantially similar to scanning device 700 as described with respect to FIGS. 7A-7C. As such, each addressable element 902 may be designed to steer a corresponding beam of radiation emanating from the corresponding addressable element. Although FIG. 9 illustrates a single row of addressable elements 902, it should be understood that any arrangement of addressable elements is possible, such as a matrix having any number of rows and columns.

By leveraging bulk fabrication techniques, the plurality of addressable elements may be made in a quick and relatively inexpensive manner.

Scanning array 900 may be used for numerous imaging applications, including OCT. As such, an optical source 904 may be coupled to a multiplexing unit 906 to deliver the various beams of radiation to each addressable element 902. Optical source 904 may include one or more lasers, one or more light emitting diodes, or one or more gas discharge sources. In one example, optical source 904 includes a swept laser source to output a range of different wavelengths.

Multiplexing unit 906 may include associated electronics that provide control signals to various modulating elements of multiplexing unit 906 in order to direct light through various waveguides that ultimately lead to each of addressable elements 902. Multiplexing unit 906 may use any multiplexing method that allows for the separation of the light directed to each addressable element 902. One such multiplexing method is time-domain multiplexing, in which multiplexing unit 906 switches between different output waveguides in a controlled manner, so that at a given time only one associated waveguide is active. Another suitable multiplexing method is frequency-domain multiplexing, in which light traversing each of the waveguides is modulated in such a way that the time-frequency behavior of signals corresponding to different waveguides can be differentiated by a processing device. Coherence-domain multiplexing may also be used in multiplexing unit 906, by introducing a different group delay to the light traversing each waveguide, so that the signals corresponding to different waveguides appear at different coherence positions and can be therefore differentiated by a processing device. In an embodiment, these methods are non-exclusive and can be combined in order to find the best design compromise. Based on the multiplexing method used, multiplexing unit 906 may be a passive element or electrically driven. Some of the multiplexing methods, like coherence-domain multiplexing, do not require any electrical actuation of multiplexing unit 906. Thus, in an embodiment, implementations based on coherence-domain multiplexing do not require electrical transmission media for control signals.

A control circuit 908 may also be included as part of scanning array 900. Control circuit 908 provides electrical signals to each of addressable elements 902. These electrical signals cause the moveable regions of the addressable elements to rotate, according to an embodiment. Control circuit 908 may be designed such that each of the addressable elements 902 rotates in unison. Control circuit 908 may send different signals to each addressable element 902 such that the rotation of each element is different. Control circuit 908 may receive inputs from another processing unit or directly from a user to select which addressable elements are used.

The array of scanning devices in combination with appropriately working integrated optics may permit reaching a high scanning rate over an extensive field of view with a high signal-to-noise ratio (SNR) even on Time Domain OCT systems. In the case of swept-source systems, this solution can increase scanning speed as each individual addressable element 902 may be designed with a large resonant and operating frequency, providing a better performance than larger bulk-optics constructions.

Each individually addressable element 902 may be associated with its own interferometer for performing OCT imaging, according to an embodiment. In another example, the beams of radiation from each addressable element 902 are multiplexed, such that they can each be used within the same interferometer.

Figure 10:
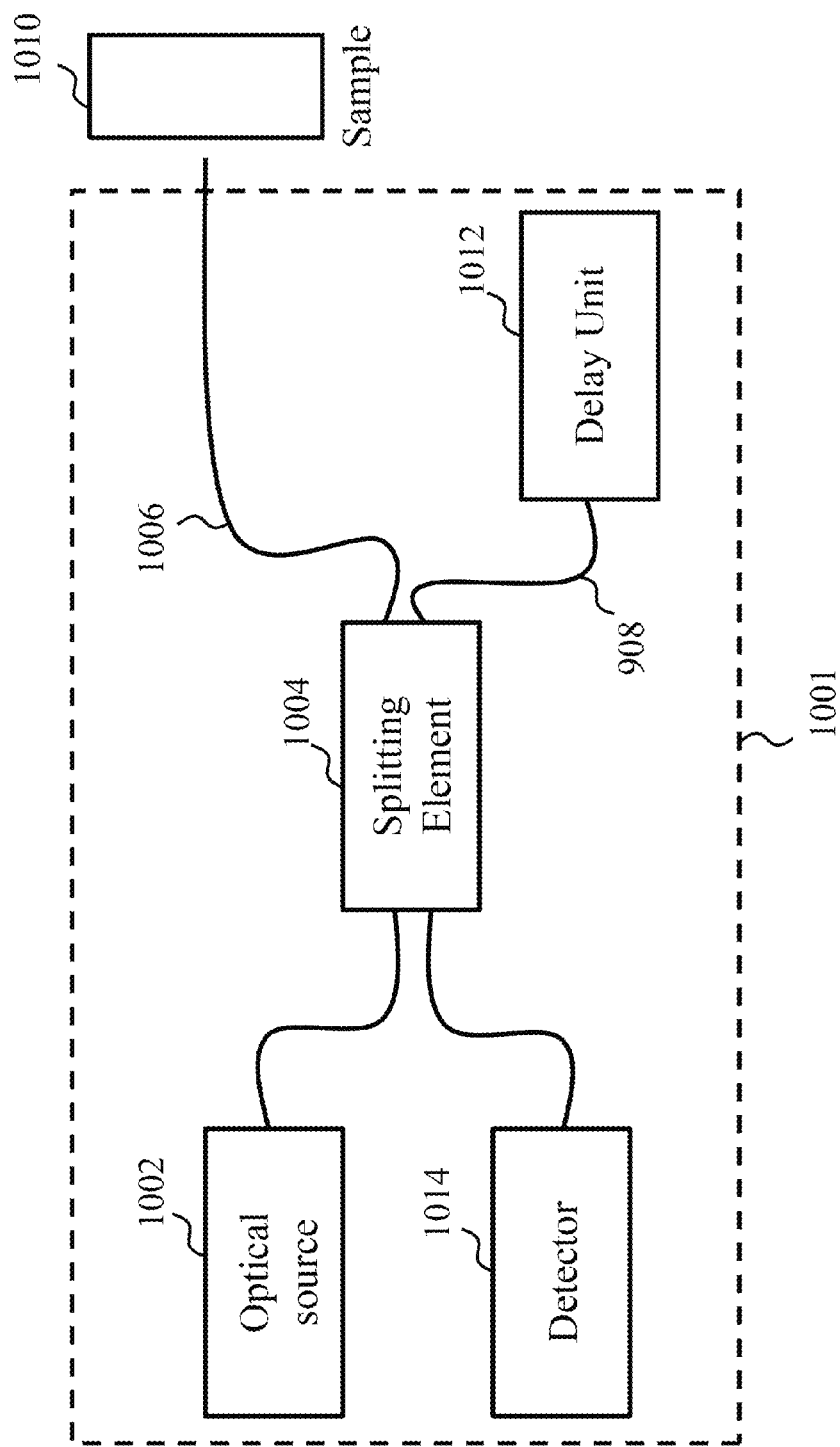
FIG. 10 illustrates a block diagram of an interferometric system, according to an embodiment.

An interferometer arrangement that can be used to perform OCT on a sample is illustrated in FIG. 10. OCT system 1001 includes an optical source 1002, a splitting element 1004, a sample arm 1006, a reference arm 1008, a delay unit 1012, and a detector 1014. Delay unit 1012 may include various light modulating elements. These modulating elements may perform phase and/or frequency modulation to counteract undesired optical effects in the light, and to select one or more depths of sample 1010 to be imaged. The use of the term "light" may refer to any range of the electromagnetic spectrum. In an embodiment, the term "light" refers to infrared radiation at a wavelength of about 1.3 µm.

In the embodiment shown, delay unit 1012 is located within reference arm 1008. However, it should be understood that delay unit 1012 may instead be located in sample arm 1006. Alternatively, various elements of delay unit 1012 may be present in both sample arm 1006 and reference arm 1008. For example, elements of delay unit 1012 that introduce a variable delay to the light may be located in sample arm 1006, while elements that modulate different polarization modes of the light may be located in reference arm 1008. In one example, sample arm 1006 and reference arm 1008 are optical waveguides, such as patterned waveguides or optical fibers. In an embodiment, all of the components of OCT system 1001 are integrated onto a planar lightwave circuit (PLC). In another embodiment, at least the components within delay unit 1012 are integrated on the same substrate of a PLC. Other implementations may be considered as well, such as, for example, fiber optic systems, free-space optical systems, photonic crystal systems, etc. The various optical components, such as splitting element 1004, sample arm 1006, reference arm 1008, and delay unit 1012, may be integrated on the same substrate as multiplexing unit 804.

It should be understood that OCT system 1001 may include any number of other optical elements not shown for the sake of clarity. For example, OCT system 1001 may include mirrors, lenses, gratings, splitters, micromechanical elements, etc., along the paths of sample arm 1006 or reference arm 1008.

Splitting element 1004 is used to direct light received from optical source 1002 to both sample arm 1006 and reference arm 1008. Splitting element 1004 may be, for example, a bi-directional coupler, an optical splitter, or any other modulating optical device that converts a single beam of light into two or more beams of light.

Light that travels down sample arm 1006 ultimately impinges upon sample 1010. In an embodiment, sample arm 1006 includes a waveguide that guides the light towards one or more of addressable elements 902. Sample 1010 may be any suitable sample to be imaged, such as tissue. The light scatters and reflects back from various depths within sample 1010, and the scattered/reflected radiation is collected back into sample arm 1006. In another embodiment, the scattered/reflected radiation is collected back into a different waveguide than the transmitting waveguide. The scan depth may be chosen via the delay imposed on the light within delay unit 1012.

Light within sample arm 1006 and reference arm 1008 is recombined before being received at detector 1014. In the embodiment shown, the light is recombined by splitting element 1004. In another embodiment, the light is recombined at a different optical coupling element than splitting element 1004. Detector 1014 may include any number of photodiodes, charge-coupling devices, and/or CMOS structures to transduce the received light into an electrical signal. The electrical signal contains depth-resolved optical data related to sample 1010 and may be received by a processing device for further analysis and signal processing procedures. As used herein, the term "depth-resolved" defines data in which one or more portions of the data related to specific depths of an imaged sample can be identified.

Optical source 1002 may include one or more light emitting diodes (LEDs) or laser diodes. For example, LEDs may be used when performing time domain and/or spectral domain analysis, while tunable lasers may be used to sweep the wavelength of the light across a range of wavelengths.

OCT system 1001 is illustrated as an interferometer design similar to a Michelson interferometer, according to an embodiment. However, other interferometer designs are possible as well, including Mach-Zehnder or Mireau interferometer designs.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A device, comprising:
a substrate having a first surface and an opposite, parallel second surface;
a waveguide patterned on the first surface and configured to guide a beam of radiation along a length of the waveguide;
a reflector disposed on the first surface and configured to reflect at least a portion of the beam of radiation at an angle that is substantially perpendicular to the first surface; and
an optical element disposed on the second surface of the substrate, and configured to receive the reflected portion of the beam of radiation.

2. The device of claim 1, wherein the substrate comprises silicon.

3. The device of claim 2, wherein the waveguide comprises silicon nitride.

4. The device of claim 1, wherein the reflector is a reflector at an end of the waveguide.

5. The device of claim 4, wherein the reflector is angled at a substantially 45 degree angle with respect to the first surface.

6. The device of claim 4, wherein the reflector is angled at a substantially 54.74 degree angle with respect to the first surface.

7. The device of claim 1, wherein the reflector is located a distance away from an end of the waveguide.

8. The device of claim 1, wherein the optical element is a mirror.

9. The device of claim 1, wherein the optical element is a lens.

10. The device of claim 9, wherein the lens is formed in the second surface of the substrate.

11. The device of claim 1, further comprising an anti-reflective (AR) coating configured to substantially reduce reflections of the beam of radiation caused by an interface between the substrate and the waveguide.

12. The device of claim 11, further comprising a second AR coating configured to substantially reduce reflections of the beam of radiation caused by a second interface between the substrate and the waveguide.

13. A scanning device, comprising:
a substrate having a first surface and an opposite, parallel second surface;
a region of the substrate having the first surface and the opposite, parallel second surface, wherein the region is defined via an etching process through a thickness of the substrate, and wherein the region remains attached to the substrate via one or more hinges;
a waveguide patterned on the first surface of the region and configured to guide a beam of radiation along a length of the waveguide;
a reflector disposed on the first surface of the region and configured to reflect at least a portion of the beam of radiation through the region; and
an optical element disposed on the second surface of the region, and configured to receive the reflected portion of the beam of radiation.

14. The scanning device of claim 13, wherein the substrate comprises silicon.

15. The scanning device of claim 13, wherein the waveguide comprises silicon nitride.

16. The scanning device of claim 13, wherein the reflector is a facet at an end of the waveguide.

17. The scanning device of claim 16, wherein the reflector is angled at a substantially 45 degree angle with respect to the first surface.

18. The scanning device of claim 13, wherein the optical element is a lens.

19. The scanning device of claim 18, wherein the lens is formed in the second surface of the region.

20. The scanning device of claim 19, further comprising a second optical element disposed on an outer surface of the optical element.

21. The scanning device of claim 13, wherein the region is configured to rotate along an axis extending through the one or more hinges.

22. The scanning device of claim 21, wherein the region is configured to rotate up to an angle of 20 degrees with respect to the first surface.

23. A scanning array, comprising:
a plurality of individually addressable elements formed from a same substrate, each element of the plurality of individually addressable elements comprising:
  a region of the substrate having a first surface and an opposite, parallel second surface, wherein the region is defined via an etching process through a thickness of the substrate, and wherein the region remains attached to the substrate via one or more hinges,
  a waveguide patterned on the first surface of the region and configured to guide a beam of radiation along a length of the waveguide,
  a reflector disposed on the first surface of the region and configured to reflect at least a portion of the beam of radiation through the region, and
  an optical element disposed on the second surface of the region, and configured to receive the reflected portion of the beam of radiation,
wherein each element of the plurality of individually addressable elements is configured to steer a corresponding beam of radiation via movement of a corresponding region.

24. The scanning array of claim 23, wherein the reflector is a facet at an end of the waveguide.

25. The scanning array of claim 23, wherein the optical element is a lens.

26. The scanning array of claim 23, wherein the region is configured to rotate along an axis extending through the one or more hinges.

27. The scanning array of claim 26, wherein the region is configured to rotate up to an angle of 20 degrees with respect to the first surface.

* * * * *